US006597723B1

(12) United States Patent
Zeira et al.

(10) Patent No.: US 6,597,723 B1
(45) Date of Patent: Jul. 22, 2003

(54) WEIGHTED OPEN LOOP POWER CONTROL IN A TIME DIVISION DUPLEX COMMUNICATION SYSTEM

(75) Inventors: Ariela Zeira, Trumball, CT (US); Sung-Hyuk Shin, Fort Lee, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/532,349

(22) Filed: Mar. 21, 2000

(51) Int. Cl.[7] ................................................ H04B 1/69
(52) U.S. Cl. ........................ 375/130; 375/295; 455/522; 370/342
(58) Field of Search ................................ 375/130, 140, 375/295; 455/522, 69; 370/342, 252

(56) References Cited

U.S. PATENT DOCUMENTS

| | | | |
|---|---|---|---|
| 4,868,795 A | 9/1989 | McDavid et al. | |
| 5,056,109 A | 10/1991 | Gilhousen et al. | 375/370 |
| 5,542,111 A | 7/1996 | Ivanov et al. | |
| 5,839,056 A | 11/1998 | Hakkinen | |
| 5,859,838 A | 1/1999 | Soliman | |
| 6,101,179 A * | 8/2000 | Soliman | 370/342 |
| 6,108,561 A * | 8/2000 | Mallinckrodt | 455/522 |
| 6,175,586 B1 * | 1/2001 | Lomp | 375/130 |
| 6,175,745 B1 * | 1/2001 | Bringby et al. | 455/522 |
| 6,188,678 B1 * | 2/2001 | Prescott | 370/318 |
| 6,373,823 B1 * | 4/2002 | Chen et al. | 370/252 |
| 6,449,462 B1 | 9/2002 | Gunnersson et al. | |

FOREIGN PATENT DOCUMENTS

| | | |
|---|---|---|
| EP | 0462952 | 12/1991 |
| EP | 0610030 | 8/1994 |
| EP | 0682419 | 11/1995 |
| WO | 9749197 | 12/1997 |
| WO | 9845962 | 10/1998 |

OTHER PUBLICATIONS

"Specification of Air–Interface for the 3G Mobile System", Version 1.0, ARIB, Jan. 14, 1999.
"Combined Closed–Loop/Open–Loop Power Control Process for Time Division Duplexing", Ariela Zeira, Sung–Hyuk Shin and Fatih Ozluturk, Apr. 1999.
"Performance of Weighted Open Loop Scheme for Uplink Power Control in TDD Mode", Ariela Zeira and Sung–Hyuk Shin, May 1999.
"Text Proposal for S1.24", Ariela Zeira, Sung–Hyuk Shin and Stephen Dick, May 1999.

* cited by examiner

Primary Examiner—Temesghen Ghebretinase
(74) Attorney, Agent, or Firm—Volpe and Koenig, P.C.

(57) ABSTRACT

The invention controls transmission power levels in a spread spectrum time division duplex communication station. A first communication station transmits a communication to a second communication station. The second station receives the communication and measures its received power level. Based on, in part, the received communication's power level and the communication's transmission power level, a path loss estimate is determined. A quality of the path loss estimate is also determined. The transmission power level for a communication from the second station to the first station is based on, in part, weighting the path loss estimate in response to the estimate's quality.

20 Claims, 5 Drawing Sheets

REQUIRED Es/No FOR BER = 0.01 vs. DELAY AT 30 km/h

REQUIRED Es/No FOR BER = 0.01 vs. DELAY AT 60 km/h

WEIGHTED OPEN LOOP POWER CONTROL IN A TIME DIVISION DUPLEX COMMUNICATION SYSTEM

BACKGROUND

This invention generally relates to spread spectrum time division duplex (TDD) communication systems. More particularly, the present invention relates to a system and method for controlling transmission power within TDD communication systems.

FIG. 1 depicts a wireless spread spectrum time division duplex (TDD) communication system. The system has a plurality of base stations $30_1$–$30_7$. Each base station $30_1$ communicates with user equipments (UEs) $32_1$–$32_3$ in its operating area. Communications transmitted from a base station $30_1$ to a UE $32_1$ are referred to as downlink communications and communications transmitted from a UE $32_1$ to a base station $30_1$ are referred to as uplink communications.

In addition to communicating over different frequency spectrums, spread spectrum TDD systems carry multiple communications over the same spectrum. The multiple signals are distinguished by their respective chip code sequences (codes). Also, to more efficiently use the spread spectrum, TDD systems as illustrated in FIG. 2 use repeating frames 34 divided into a number of time slots $36_1$–$36_n$, such as fifteen time slots. In such systems, a communication is sent in selected time slots $36_1$–$36_n$ using selected codes. Accordingly, one frame 34 is capable of carrying multiple communications distinguished by both time slot $36_1$–$36_n$ and code. The use of a single code in a single time slot is referred to as a resource unit. Based on the bandwidth required to support a communication, one or multiple resource units are assigned to that communication.

Most TDD systems adaptively control transmission power levels. In a TDD system, many communications may share the same time slot and spectrum. When a UE $32_1$ or base station $30_1$ is receiving a specific communication, all the other communications using the same time slot and spectrum cause interference to the specific communication. Increasing the transmission power level of one communication degrades the signal quality of all other communications within that time slot and spectrum. However, reducing the transmission power level too far results in undesirable signal to noise ratios (SNRs) and bit error rates (BERs) at the receivers. To maintain both the signal quality of communications and low transmission power levels, transmission power control is used.

One approach using transmission power control in a code division multiple access (CDMA) communication system is described in U.S. Pat. No. 5,056,109 (Gilhousen et al.). A transmitter sends a communication to a particular receiver. Upon reception, the received signal power is measured. The received signal power is compared to a desired received signal power. Based on the comparison, a control bit is sent to the transmitter either increasing or decreasing transmission power by a fixed amount. Since the receiver sends a control signal to the transmitter to control the transmitter's power level, such power control techniques are commonly referred to as closed loop.

Under certain conditions, the performance of closed loop systems degrades. For instance, if communications sent between a UE $32_1$ and a base station $30_1$ are in a highly dynamic environment, such as due to the UE $32_1$ moving, such systems may not be able to adapt fast enough to compensate for the changes. The update rate of closed loop power control in a typical TDD system is 100 cycles per second which is not sufficient for fast fading channels. Accordingly, there is a need for alternate approaches to maintain signal quality and low transmission power levels.

SUMMARY

The invention controls transmission power levels in a spread spectrum time division duplex communication station. A first communication station transmits a communication to a second communication station. The second station receives the communication and measures its received power level. Based on, in part, the received communication's power level and the communication's transmission power level, a path loss estimate is determined. The transmission power level for a communication from the second station to the first station is set based on, in part, weighting the path loss estimate and a long term pathloss estimate.

DETAILED DESCRIPTION OF THE PREFERRED EMBODIMENTS

Figure 1:
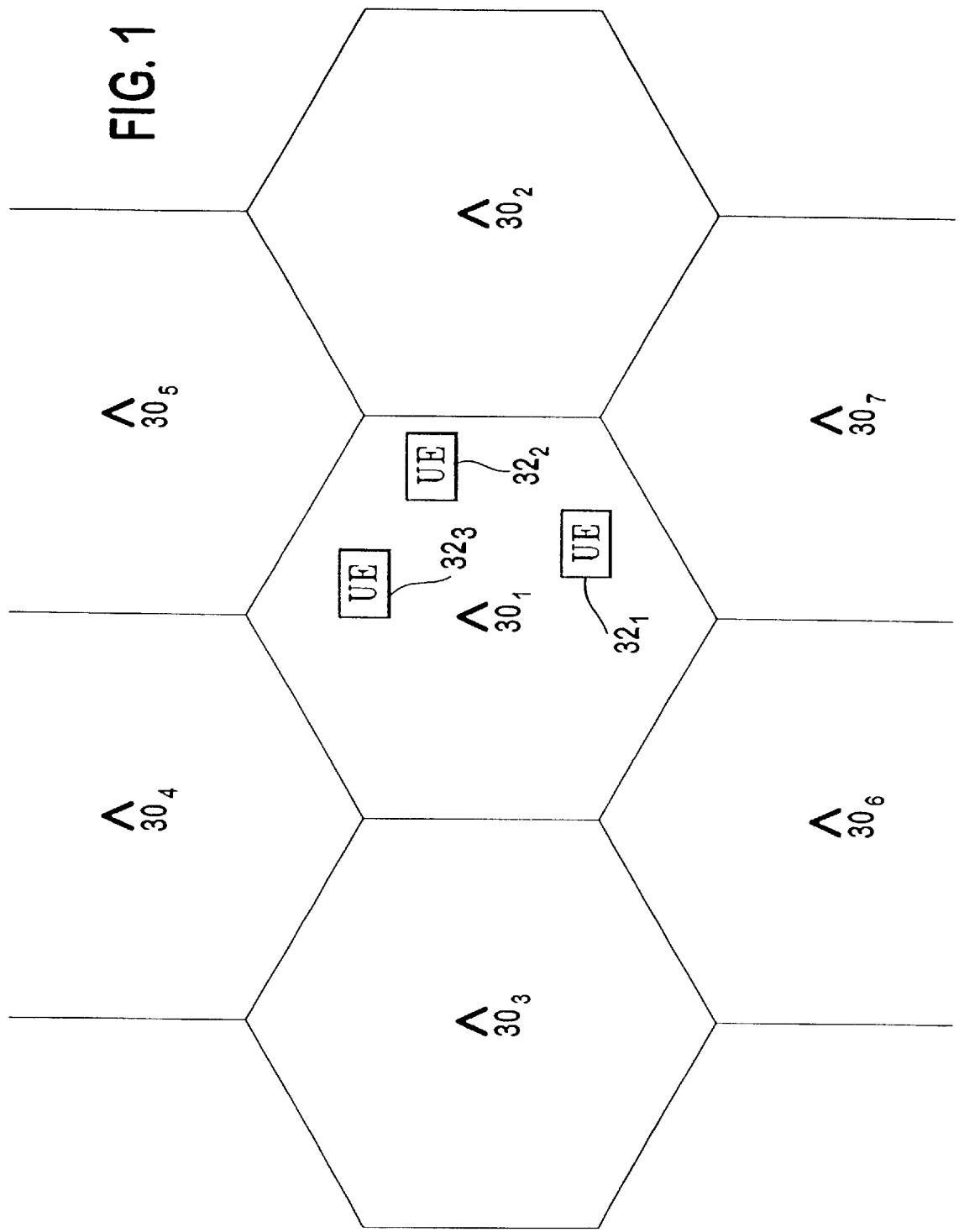
FIG. 1 illustrates a prior art TDD system.
Figure 2:
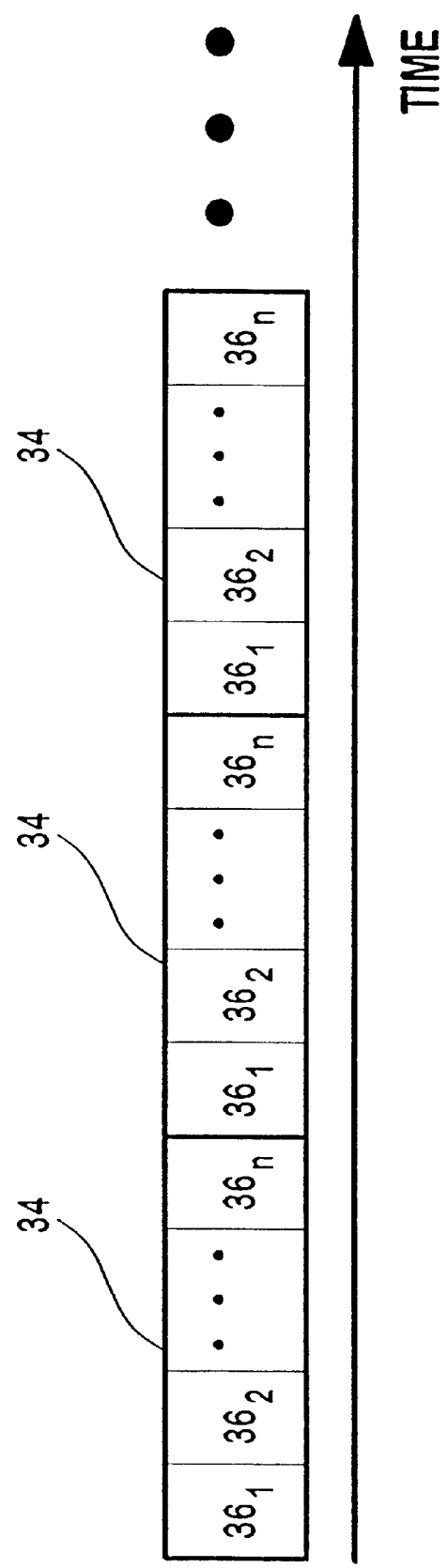
FIG. 2 illustrates time slots in repeating frames of a TDD system.
Figure 3:
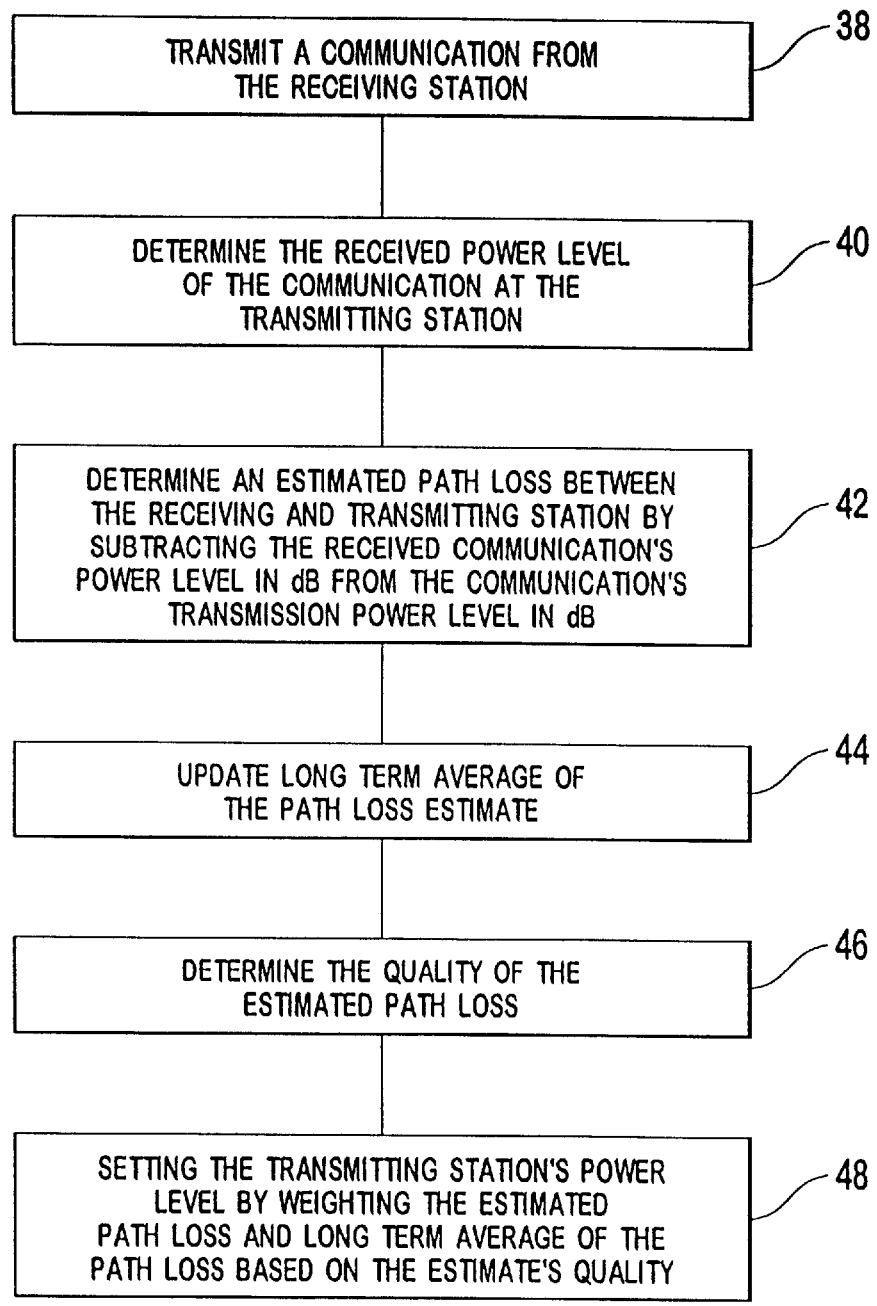
FIG. 3 is a flow chart of weighted open loop power control.
Figure 4:
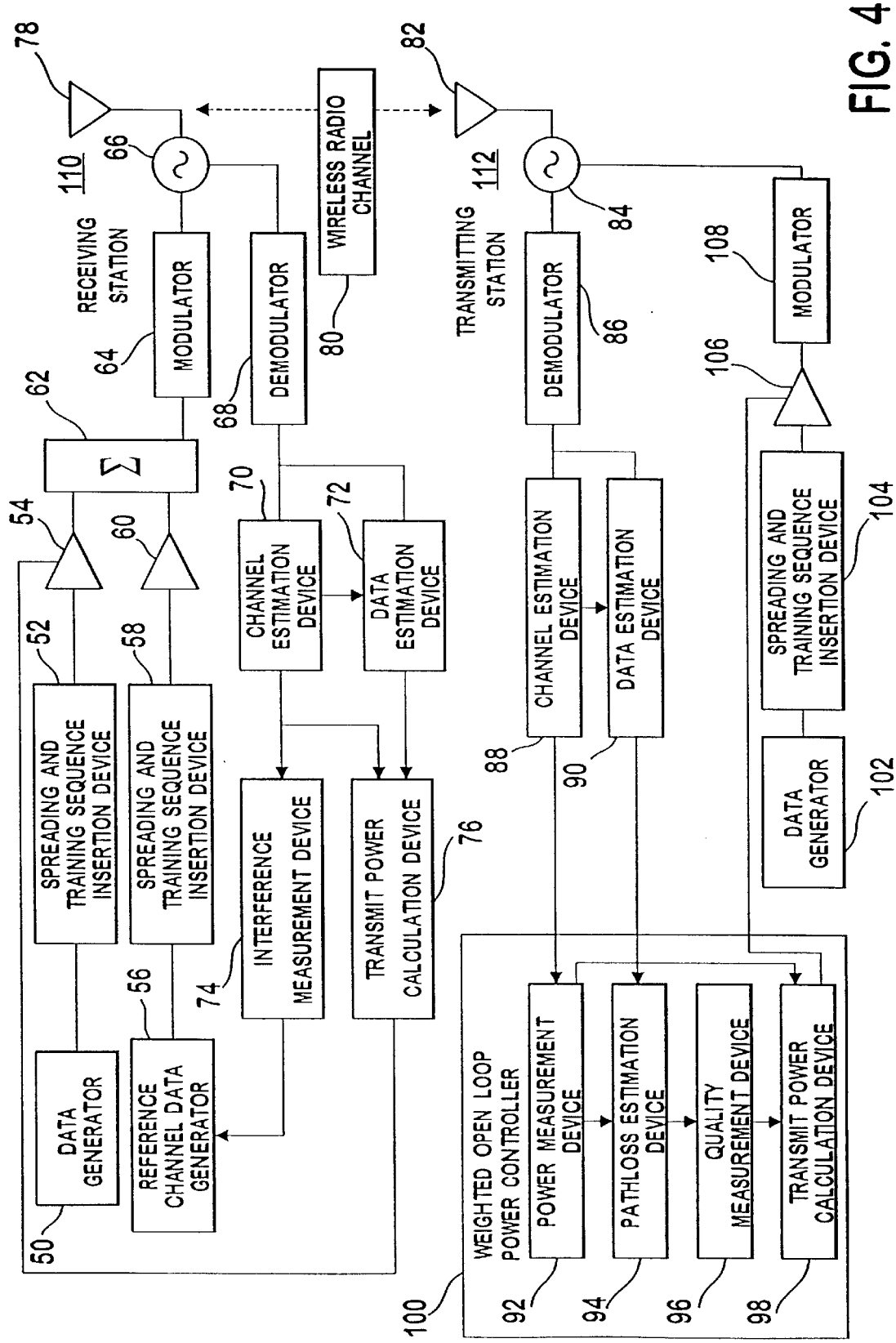
FIG. 4 is a diagram of components of two communication stations using weighted open loop power control.

The preferred embodiments will be described with reference to the drawing figures where like numerals represent like elements throughout. Weighted open loop power control will be explained using the flow chart of FIG. 3 and the components of two simplified communication stations 110, 112 as shown in FIG. 4. For the following discussion, the communication station having its transmitter's power controlled is referred to as the transmitting station 112 and the communication station receiving power controlled communications is referred to as the receiving station 110. Since weighted open loop power control may be used for uplink, downlink or both types of communications, the transmitter having its power controlled may be located at a base station $30_1$, UE $32_1$ or both. Accordingly, if both uplink and downlink power control are used, the receiving and transmitting station's components are located at both the base station $30_1$ and UE $32_1$.

For use in estimating the path loss between the receiving and transmitting stations 110, 112, the receiving station 110 sends a communication to the transmitting station 112. The communication may be sent on any one of various channels. Typically, in a TDD system, the channels used for estimating path loss are referred to as reference channels, although other channels may be used. If the receiving station 110 is a base station $30_1$, the communication is preferably sent over a downlink common channel or a Common Control Physical Channel (CCPCH).

Data to be communicated to the transmitting station 112 over the reference channel is referred to as reference channel data. The reference channel data is generated by a reference channel data generator 56. The reference data is assigned one or multiple resource units based on the communication's bandwidth requirements. A spreading and training sequence insertion device 58 spreads the reference channel data and makes the spread reference data time-multiplexed with a training sequence in the appropriate time slots and codes of the assigned resource units. The resulting sequence is referred to as a communication burst. The communication burst is subsequently amplified by an amplifier 60. The amplified communication burst may be summed by a sum device 62 with any other communication burst created through devices, such as a data generator 50, spreading and training sequence insertion device 52 and amplifier 54. The summed communication bursts are modulated by a modulator 64. The modulated signal is passed through an isolator 66 and radiated by an antenna 78 as shown or, alternately, through an antenna array, step 38. The radiated signal is passed through a wireless radio channel 80 to an antenna 82 of the transmitting station 112. The type of modulation used for the transmitted communication can be any of the those known to those skilled in the art, such as direct phase shift keying (DPSK) or quadrature phase shift keying (QPSK).

The antenna 82 or, alternately, antenna array of the transmitting station 112 receives various radio frequency signals. The received signals are passed through an isolator 84 to a demodulator 86 to produce a baseband signal. The baseband signal is processed, such as by a channel estimation device 88 and a data estimation device 90, in the time slots and with the appropriate codes assigned to the communication's burst. The channel estimation device 88 commonly uses the training sequence component in the baseband signal to provide channel information, such as channel impulse responses. The channel information is used by the data estimation device 90 and a power measurement device 92. The power level of the processed communication corresponding to the reference channel, $R_{TS}$, is measured by the power measurement device 92 and sent to a pathloss estimation device 94, step 40. The channel estimation device 88 is capable of separating the reference channel from all other channels. If an automatic gain control device or amplifier is used for processing the received signals, the measured power level is adjusted to correct for the gain of these devices at either the power measurement device 92 or the pathloss estimation device 94.

To determine the path loss, L, the transmitting station 112 also requires the communication's transmitted power level, $T_{RS}$. The transmitted power level, $T_{RS}$, may be sent along with the communication's data or in a signaling channel. If the power level, $T_{RS}$, is sent along with the communication's data, the data estimation device 90 interprets the power level and sends the interpreted power level to the pathloss estimation device 94. If the receiving station 110 is a base station $30_1$, preferably the transmitted power level, $T_{RS}$, is sent via the broadcast channel (BCH) from the base station $30_1$. By subtracting the received communication's power level, $R_{TS}$ in dB, from the sent communication's transmitted power level, $T_{RS}$ in dB, the pathloss estimation device 94 estimates the path loss, L, between the two stations 110, 112, step 42. Additionally, a long term average of the pathloss, $L_0$, is updated, step 44. In certain situations, instead of transmitting the transmitted power level, $T_{RS}$, the receiving station 110 may transmit a reference for the transmitted power level. In that case, the pathloss estimation device 94 provides reference levels for the path loss, L, and the long term average of the path loss, $L_0$.

Since TDD systems transmit downlink and uplink communications in the same frequency spectrum, the conditions these communications experience are similar. This phenomenon is referred to as reciprocity. Due to reciprocity, the path loss experienced for the downlink will also be experienced for the uplink and vice versa. By adding the estimated path loss to a desired received power level, a transmission power level for a communication from the transmitting station 112 to the receiving station 110 is determined. This power control technique is referred to as open loop power control.

Open loop systems have drawbacks. If a time delay exists between the estimated path loss and the transmitted communication, the path loss experienced by the transmitted communication may differ from the calculated loss. In TDD where communications are sent in differing time slots $36_1$–$36_n$, the time slot delay between received and transmitted communications may degrade the performance of an open loop power control system. To overcome these drawbacks, a quality measurement device 96 in a weighted open loop power controller 100 determines the quality of the estimated path loss, step 46. The quality measurement device 96 also weights the estimated path loss, L, and long term average of the pathloss, $L_0$, to set the transmit power level by transmit power calculation device 98, step 48. As illustrated in FIG. 4, the weighted open loop power controller 100 consists of the power measurement device 92, pathloss estimation device 94, quality measurement device 96, and transmit power calculation device 98.

The following is one of the preferred weighted open loop power control algorithms. The transmitting station's power level in decibels, $P_{TS}$, is determined using Equation 1.

$$P_{TS}=P_{RS}+\alpha(L-L_0)+L_0+\text{CONSTANT VALUE} \qquad \text{Equation 1}$$

$P_{RS}$ is the power level that the receiving station 110 desires to receive the transmitting station's communication in dB. $P_{RS}$ is determined by the desired SIR, $SIR_{TARGET}$, at the receiving station 110 and the interference level, $I_{RS}$, at the receiving station 110.

To determine the interference level, $I_{RS}$, at the receiving station, received communications from the transmitting station 112 are demodulated by a demodulator 68. The resulting baseband signal is processed, such as by a channel estimation device 70 and a data estimation device 72 in the time slots and with the appropriate codes assigned the transmitting station's communications. The channel information produced by the channel estimation device 70 is used by an interference measurement device 74 to determine the interference level, $I_{RS}$. The channel information may also be used to control the transmit power level of the receiving station 110. The channel information is input to a data estimation device 72 and a transmit power calculation device 76. The data estimation produced by the data estimation device 72 is used with the channel information by the transmit power calculation device 76 to control the amplifier 54 which controls the receiving station's transmit power level.

$P_{RS}$ is determined using Equation 2.

$$P_{RS}=SIR_{TARGET}+I_{RS} \qquad \text{Equation 2}$$

$I_{RS}$ is either signaled or broadcasted from the receiving station 110 to the transmitting station 112. For downlink power control, $SIR_{TARGET}$ is known at the transmitting station 112. For uplink power control, $SIR_{TARGET}$ is signaled from the receiving station 110 to the transmitting station 112. Using Equation 2, Equation 1 is rewritten as either Equations 3 or 4.

$$P_{TS}=SIR_{TARGET}+I_{RS}+\alpha(L-L_0)+L_0+\text{CONSTANT VALUE} \quad \text{Equation 3}$$

$$P_{TS}=\alpha L+(1-\alpha)L_{0+IRS}+SIR_{TARGET}+\text{CONSTANT VALUE} \quad \text{Equation 4}$$

L is the path loss estimate in decibels, $T_{RS}-R_{TS}$, for the most recent time slot $36_1-36_n$ that the path loss was estimated. The long term average of the pathloss, $L_0$, is a running average of the path loss estimates L. The CONSTANT VALUE is a correction term. The CONSTANT VALUE corrects for differences in the uplink and downlink channels, such as to compensate for differences in uplink and downlink gain. Additionally, the CONSTANT VALUE may provide correction if the transmit power reference level of the receiving station is transmitted, instead of the actual transmit power, $T_{RS}$. If the receiving station is a base station $30_1$, the CONSTANT VALUE is preferably sent via Layer 3 signaling.

The weighting value, α, determined by the quality measurement device 94, is a measure of the quality of the estimated path loss and is, preferably, based on the number of time slots $36_1-36_n$ between the time slot, n, of the last path loss estimate and the first time slot of the communication transmitted by the transmitting station 112. The value of a is from zero to one. Generally, if the time difference between the time slots is small, the recent path loss estimate will be fairly accurate and a is set at a value close to one. By contrast, if the time difference is large, the path loss estimate may not be accurate and the long term average path loss measurement is most likely a better estimate for the path loss. Accordingly, α is set at a value closer to zero.

Equations 5 and 6 are two equations for determining a, although others may be used.

$$\alpha=1-(D-1)/(D_{max}-1) \quad \text{Equation 5}$$

$$\alpha=\max\{1-(D-1)/(D_{max-allowed}-1), 0\} \quad \text{Equation 6}$$

The value, D, is the number of time slots $36_1-36_n$ between the time slot of the last path loss estimate and the first time slot of the transmitted communication which will be referred to as the time slot delay. If the delay is one time slot, α is one. $D_{max}$ is the maximal possible delay. A typical value for a frame having fifteen time slots is seven. If the delay is $D_{max}$, α is zero. $D_{max-allowed}$ is the maximum allowed time slot delay for using open loop power control. If the delay exceeds $D_{max-allowed}$, the long term average pathloss measurement, $L_0$, is considered the better estimate for the pathloss and α=0. Using the transmit power level, $P_{TS}$, determined by a transmit power calculation device 98, the weighted open loop power controller 100 sets the transmit power of the transmitted communication, step 48.

Data to be transmitted in a communication from the transmitting station 112 is produced by a data generator 102. The communication data is spread and time-multiplexed with a training sequence by the spreading and training sequence insertion device 104 in the appropriate time slots and codes of the assigned resource units. The spread signal is amplified by the amplifier 106 and modulated by the modulator 108 to radio frequency.

The weighted open loop power controller 100 controls the gain of the amplifier 106 to achieve the determined transmit power level, $P_{TS}$, for the communication. The communication is passed through the isolator 84 and radiated by the antenna 82.

Figure 5:
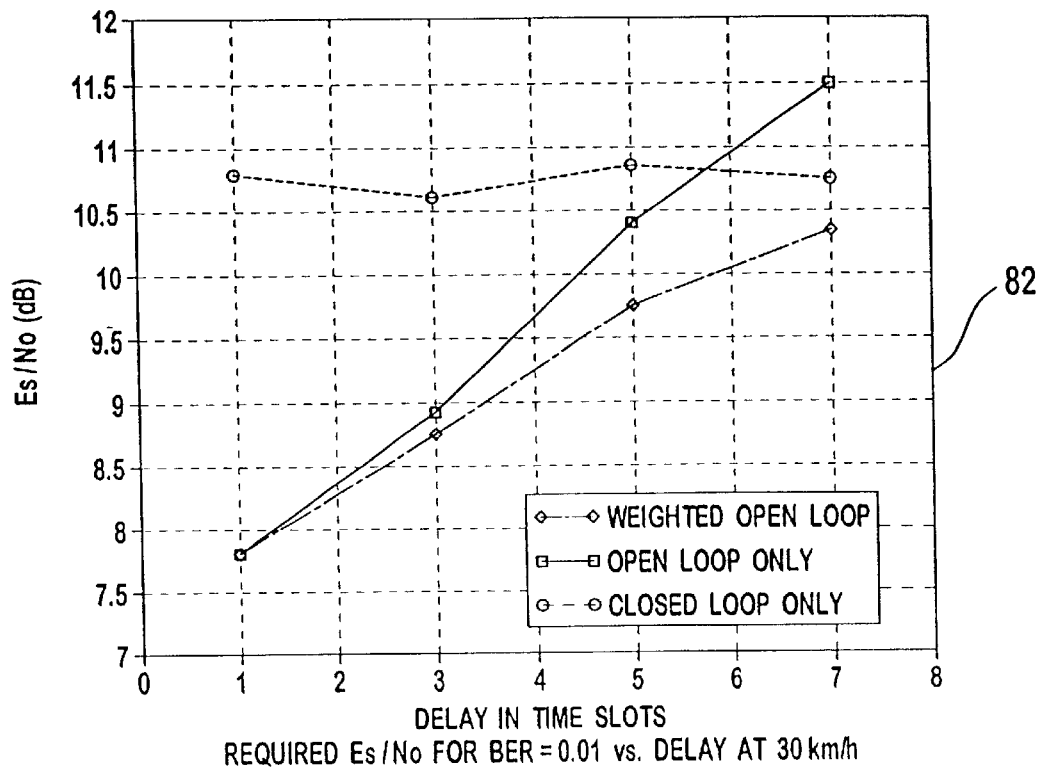
FIG. 5 depicts a graph of the performance of a weighted open loop, open loop and closed loop power control system for a UE moving at 30 kilometers per hour (km/h).
Figure 6:
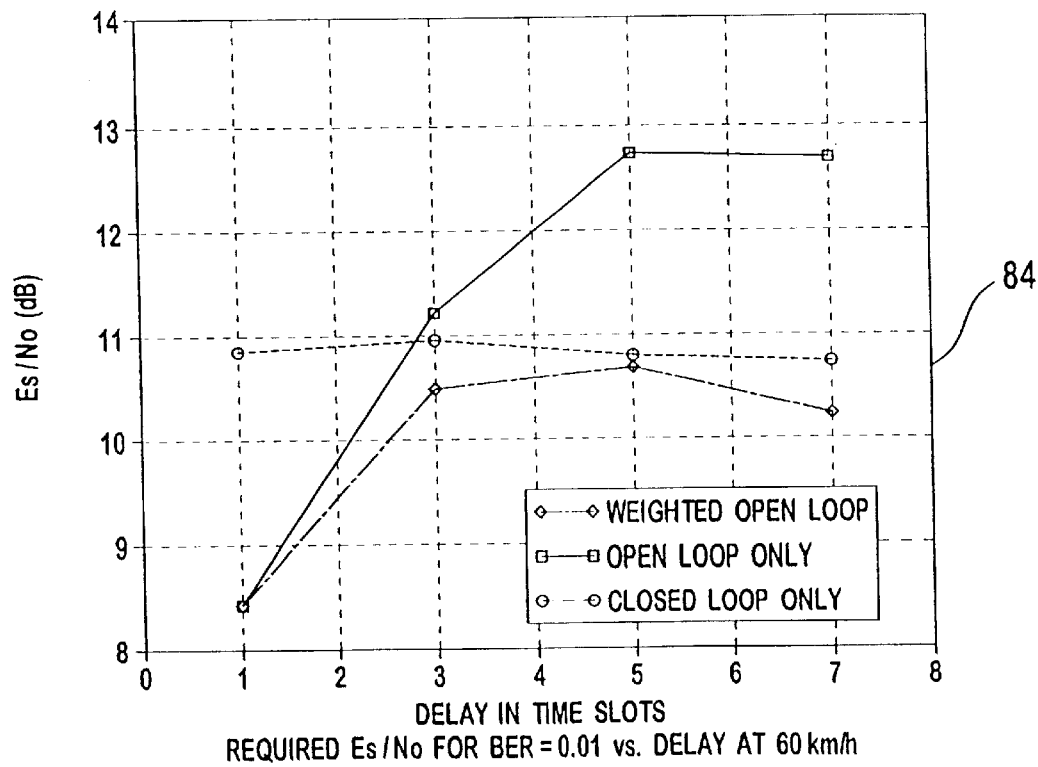
FIG. 6 depicts a graph of the three systems' performance for a UE moving at 60 km/h.

FIGS. 5 and 6 depict graphs 82, 84 illustrating the performance of a weighted open loop system using Equation 4. Equation 5 is used to calculate α. These graphs 82, 84 depict the results of simulations comparing the performance of a weighted open loop, an open loop and a closed loop system controlling the transmission power level of the transmitting station 112. The simulations address the performance of these systems in a fast fading channel under steady-state conditions. In this example, the receiving station is a base station 30, and the transmitting station is a UE $32_1$. For the simulation, the UE $32_1$ was a mobile station. The simulated base station $30_1$ used two antenna diversity for reception with each antenna having a three finger RAKE receiver. The simulation approximated a realistic channel and SIR estimation based on a midamble sequence of burst type 1 field in the presence of additive white Gaussian noise (AWGN). The simulation used an International Telecommunication Union (ITU) Pedestrian B type channel and QPSK modulation. Interference levels were assumed to be accurately known with no uncertainty. Channel coding schemes were not considered. The CONSTANT VALUE and $L_0$ were set at 0 db.

For each of the power control techniques, FIG. 5, graph 82 shows the energy for a transmitted complex symbol in decibels (Es/No) required to maintain a BER of 1% for various time slot delays, D, with the UE $32_1$ moving at 30 kilometers per hour (km/h). As shown, at lower time slot delays, both weighted open loop and open loop outperform closed loop. For higher time slot delays, weighted open loop outperforms both open loop and closed loop. As shown in FIG. 6, graph 84, similar results occur if the UE $32_1$ is traveling at 60 km/h.

What is claimed is:

1. A method for controlling transmission power levels in a spread spectrum time division duplex communication system having frames with time slots for communication, the method comprising:

transmitting a first communication having a transmission power level in a first time slot from a first communication station;

receiving at a second communication station the first communication and measuring a power level of the first communication as received;

determining a path loss estimate based on in part the measured received first communication power level and the first communication transmission power level;

setting a transmission power level for a second communication in a second time slot from the second station to the first station based on in part combining the path loss estimate weighted by a first factor with a long term path loss estimate weighted by a second factor, wherein the first and second factors are a function of a time separation of the first and second time slots; and determining a quality, α of the path loss estimate based on in part a number of time slots, D, between the first and second time slot; and wherein the first factor is α and the second factor is 1−α.

2. The method of claim 1 further comprising:

determining the long term path loss estimate based at least in part upon an average of path loss estimates of communications sent from the first station to the second station.

3. The method of claim 1 wherein a maximum time slot delay is $D_{max}$ and the determined quality, α, is determined by $$\alpha=1-(D-1)/(D_{max}-1).$$

4. The method of claim 1 wherein a maximum allowed time slot delay is $D_{max-allowed}$ and the determined quality, α, is determined by $$\alpha=\max\{1-(D-1)/(D_{max-allowed}-1),0\}.$$

5. The method of claim 1 wherein the set transmission power level compensates for differences in the uplink and downlink gains.

6. The method of claim 1 wherein the first station is a base station and the second station is a user equipment.

7. The method of claim 1 wherein the first station is a user equipment and the second station is a base station.

8. A spread spectrum time division duplex communication system having a first and second communication station, the system using frames with time slots for communication, the system comprising:

the first station comprising:
means for transmitting a first communication having a transmit power level in a first time slot; and
the second station comprising:
means for receiving the first communication and measuring a power level of the first communication as received;
means for determining a path loss estimate based on in part the measured received first communication power level and the first communication transmission power level;
means for setting a transmission power level for a second communication in a second time slot based on in part combining the path loss estimate weighted by a first factor with a long term path loss estimate weighted by a second factor, wherein the first and second factors are a function of a time separation of the first and second time slots;
means for transmitting the second communication in the second time slot at the set transmission power level; and
means for determining a quality, α, of the path loss estimate based on in part a number of time slots, D, between the first and second time slot; and
wherein the first factor is α and the second factor is 1-α.

9. The system of claim 8 wherein the second station further comprises:
means for determining the long term path loss estimate based at least in part upon an average of path loss estimates of communications sent from the first station to the second station.

10. The system of claim 8 wherein a maximum time slot delay is $D_{max}$ and the determined quality, α, is determined by $$\alpha=1-(D-1)/(D_{max}-1).$$

11. The system of claim 8 wherein a maximum allowed time slot delay is $D_{max-allowed}$ and the determined quality, α, is determined by $$\alpha=\max\{1-(D-1)/(D_{max-allowed}-1),0\}.$$

12. The system of claim 8 herein the setting means sets the transmission power level to compensate for differences in the uplink and downlink gains.

13. The system of claim 8 herein the first station is a base station and the second station is a user equipment.

14. The system of claim 8 wherein the first station is a user equipment and the second station is a base station.

15. A communication station having its transmission power level controlled in a spread spectrum time division duplex communication system, the system using frames with time slots for communication and having a second communication station transmitting a first communication in a first time slot, the communication station comprising:

at least one antenna for receiving the first communication and transmitting an amplified second communication in a second time slot;
a channel estimation device having an input configured to receive the received first communication for producing channel information;
a data estimation device having inputs configured to receive the received first communication and the channel information for producing interpreted data;
a power measurement device having an input configured to receive the channel information for producing a measurement of a received power level of the first communication;
a pathloss estimation device having an input configured to receive the measured received power level for producing a pathloss estimate for the first communication;
a quality measurement device for producing a quality measurement based at least in part upon a time separation of the first time slot and a second time slot;
a transmit power calculation device having inputs configured to receive the pathloss estimation and the quality measurement for producing a power control signal based at least in part upon combining the path loss estimate weighted by a first factor and a long term pathloss estimate weighted by a second factor, wherein the first and second factors are based on in part the quality measurement; and
an amplifier having inputs configured to receive the power control signal and a second communication to be transmitted in the second time slot for amplifying the second communication in response to the power control signal to produce the amplified second communication.

16. The communication station of claim 15 further comprising:
a data generator for producing communication data;
a spreading and training sequence insertion device having an input configured to receive the communication data for producing the second communication in the second time slot; and
a modulator having an input configured to receive the amplified second communication for modulating the amplified second communication to radio frequency prior to transmission.

17. The communication station of claim 15 further comprising:
a demodulator having an input configured to receive the received first communication for producing a baseband signal; and
wherein both the channel estimation device and the data estimation device have an input configured to receive the baseband signal.

18. The communication station of claim 15 wherein the quality measurement is in the range of zero to one and the first factor is the quality measurement and the second factor is one minus the quality measurement.

19. The communication station of claim 15 wherein the first station is a base station and the second station is a user equipment.

20. The communication station of claim 15 wherein the first station is a user equipment and the second station is a base station.

* * * * *

UNITED STATES PATENT AND TRADEMARK OFFICE
CERTIFICATE OF CORRECTION

PATENT NO. : 6,597,723 B1
DATED : July 22, 2003
INVENTOR(S) : Zeira et al.

It is certified that error appears in the above-identified patent and that said Letters Patent is hereby corrected as shown below:

<u>Title page</u>,
Item [56], References Cited, FOREIGN PATENT DOCUMENTS, insert
-- EP    0500689B1 4/1998 --.

<u>Column 7</u>,
Line 56, delete the word "herein", and insert therefore -- wherein --.

Signed and Sealed this

Third Day of August, 2004

JON W. DUDAS
*Acting Director of the United States Patent and Trademark Office*